United States Patent
Dufour

[11] Patent Number: 4,838,674
[45] Date of Patent: Jun. 13, 1989

[54] MULTIFOCAL OPHTHALMIC LENS

[75] Inventor: Maurice Dufour, Paris, France

[73] Assignee: Essilor International (Compagnie Générale d'Optique), France

[21] Appl. No.: 210,667

[22] Filed: Jun. 23, 1988

[30] Foreign Application Priority Data

Jul. 7, 1987 [FR] France .................. 87 09613

[51] Int. Cl.$^4$ .............................................. G02C 7/06
[52] U.S. Cl. ................................................... 351/169
[58] Field of Search ............... 351/168, 169, 170, 171, 351/172

[56] References Cited

U.S. PATENT DOCUMENTS 4,315,673  2/1982  Guilino et al. .................. 351/169
4,676,610  6/1987  Barkan et al. .................. 351/169

Primary Examiner—Rodney B. Bovernick
Assistant Examiner—Scott J. Sugarman

[57] ABSTRACT

In this lens, the curvature of the main meridian curve of power progression (MP) begins to vary from a point (A3) situated within the intermediate vision zone (VI) at a predetermined distance d1 from the point (A1) on the main meridian curve (MP) situated at the bottom of the far vision zone (VL), and it continues to vary down to a point (A4) situated in the near vision zone (VP) on an extension (MP') of the main meridian curve (MP), and at a predetermined distance d2 from the point (A2) on the main meridian curve (MP) situated at the top of the near vision zone (VP), with the curvature difference between the points (A2 and A4) having a predetermined value ΔC. The values of d1, d2, and ΔC are decreasing functions of the power addition A between the points (A1 and A2).

4 Claims, 3 Drawing Sheets

FIG_1
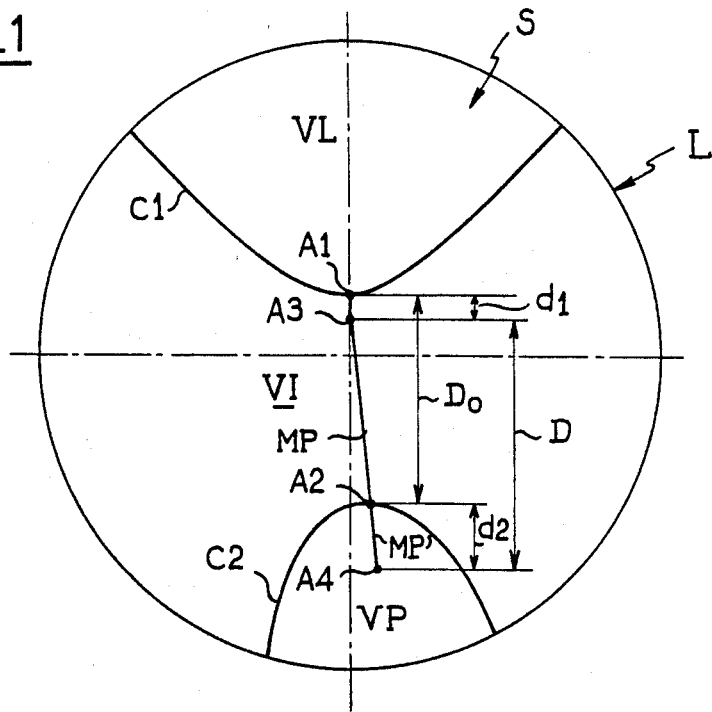
FIG_7
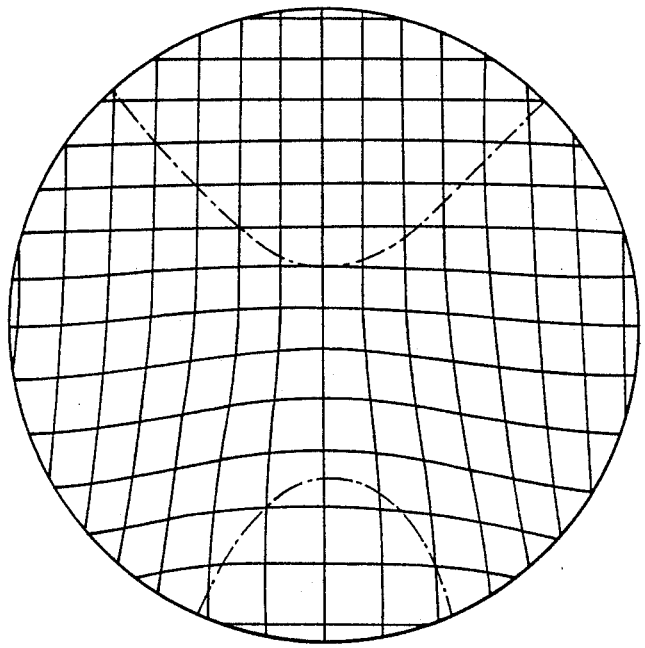

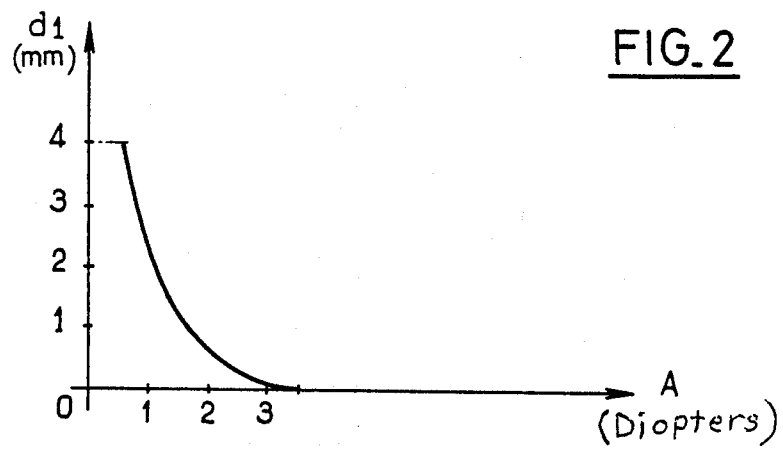
FIG._2
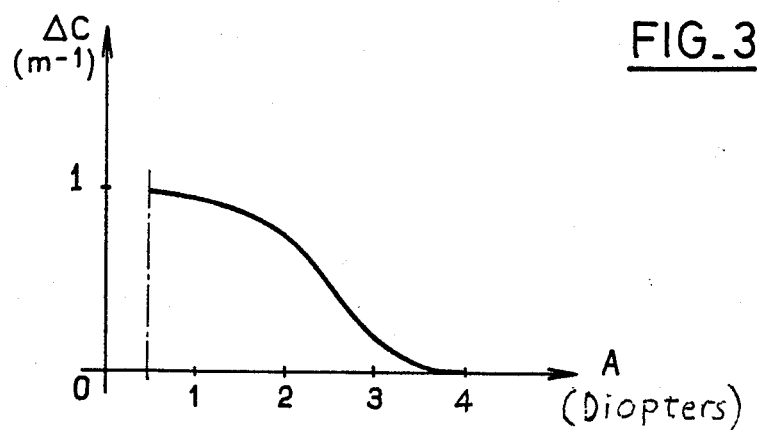
FIG._3
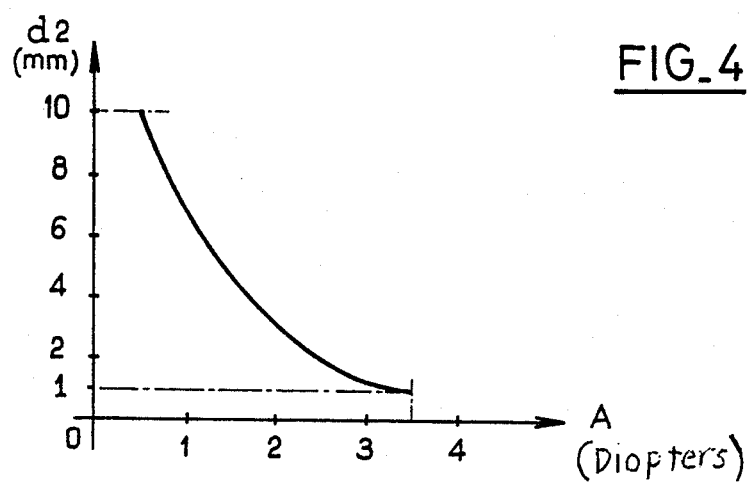
FIG._4

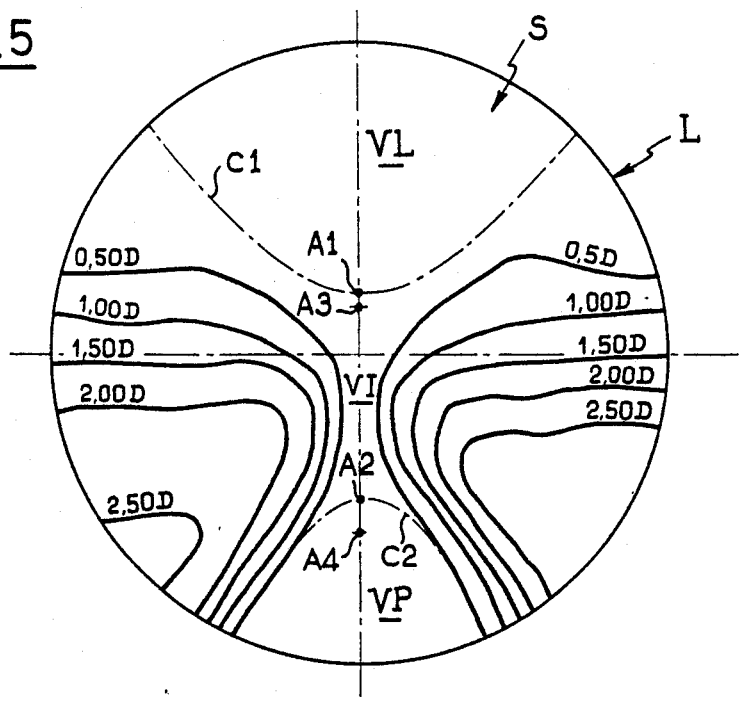
FIG_5
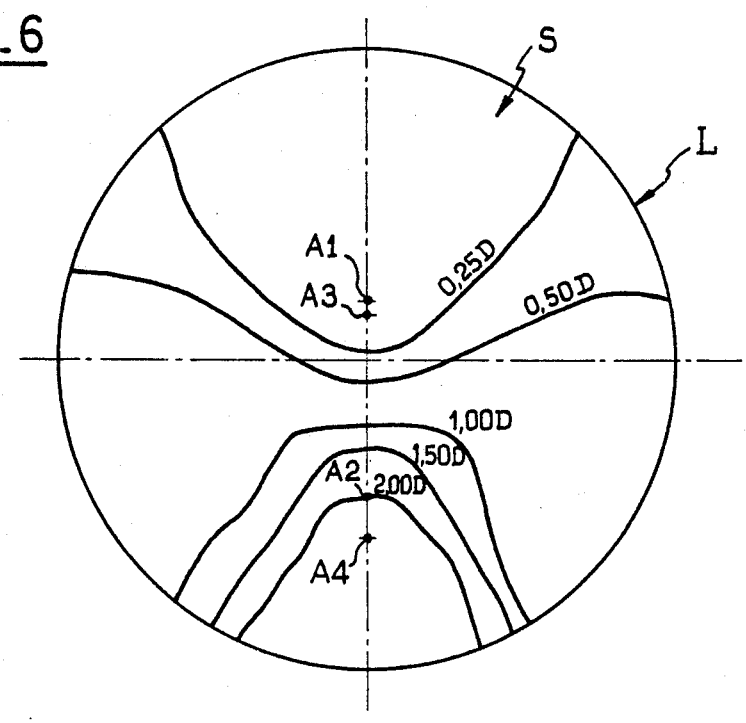
FIG_6

MULTIFOCAL OPHTHALMIC LENS

The present invention relates to a multifocal opthalmic lens of the type comprising an aspherical surface having a first vision zone for far vision, a second vision zone for near vision, and between said zones, a third vision zone for intermediate vision, with its curvature varying progressively along a main meridian curve of power progression, the first and third vision zones being delimited by a first curve intersecting the main meridian curve at a first point, and the second and third vision zones being delimited by a second curve intersecting the main meridian curve at a second point.

BACKGROUND OF THE INVENTION

Multifocal ophthalmic lenses are now well known. They are normally used for correcting presbyopia, while enabling the wearer of spectacles to observe objects over a wide range of distances, without requiring to remove the spectacles to see distant objects. In conventional multifocal opthalmic lenses the term "power addition" or, in short "addition", is used to indicate the increase in optical power between the first and second above-mentioned points on the main meridian curve. Usually, the manufacturers of multifocal opthalmic lenses provide a family of half-finished lenses, i.e. for lenses of the same family, the lens surface including the three above-mentioned vision zones is machined initially on its own, with the other surface of a lens in the family being subsequently machined to a sphericl or toroidal shape having curvature appropriate to each wearer of spectacles, depending on the prescriptions of an opthalmologist. Within a family of lenses, power addition varies gradually from one lens to another in the family between a minimum addition value and a maximum addition value. Usually, the minimum and maximum addition values are respectively 0.5 diopters and 3.5 diopters, and addition varies in 0.25 diopter steps from one lens to the next within a family. In this case, a family of lenses comprises 13 lenses.

The multifocal opthalmic lenses which are commercially available at present come in two main families. In the first family of lenses, progression length, i.e. the distance between the first and second above-mentioned points on the main meridian curve is constant, and the optical power progression gradient varies from one lens to another in said first family. More precisely, the higher the power addition, the faster the increase in optical power along the main meridian curve between the first and second points thereof. An example of multifocal opthalmic lenses in the first family is represented by "VARILUX 2" lenses manufactured by the Applicant (French patent FR No. 2 058 499 and its two certificates of addition FR No. 2 079 663 and FR 2 193 989, equivalent to U.S. Pats. Nos. 3,687,528 and 3,910,691.

In the second family of lenses, the gradient of optical power progression along the main meridian curve is constant and identical for all of the lenses in said second family, regardless of their power addition. In this case, the progression length increases linearly with the value of the power addition. An example of lenses in the second family is described, for example, in Japanese patent No. JP 54-85743.

It is well known that regardless of the family to which they belong, multifocal opthalmic lenses inevitably suffer from optical aberrations (astigmatism, distortion, field curvature, etc.) which reduce visual comfort both in static vision and in dynamic vision. In addition, as the presbyopia of a long-sighted person increases, requiring the use of lenses havig increasing power addition, the changeover to lenses having greater power addition usually requires an effort of physiological adaptation on the part of the spectacle wearer. The adaptation time may be from one to several days depending on the person.

In the past, manufacturers of multifocal opthalmic lenses have directed their efforts mostly to improving visual comfort. To this end, several means have already been proposed and used either separately or in combination, namely:

(a) A suitable choice of progression law for the optical power along the main meridian curve.

(b) Optical modulation, i.e. distributing optical powers over the side portions of the surface of the lens, for example by an appropriate selection of main curvatures of the surface along its horizontal sections (French patent No. FR 2 058 499, equivalent to U.S. Pat. No. 3,687,528.

(c) Reducing surface distortion so as to satisfy the orthoscopic condition (horizontal lines and vertical lines in the field of view remain horizontal and vertical). This may be obtained, for example, by providing the surface of the lens with one or more horizontal umbilical lines and one or more vertical umbilical lines (with the main radii of curvature of the surface at each point along such lines having the same value) and/or one or more horizontal lines and one or more vertical lines along which the prismatic effect is constant in value (at each point along a line of constant prismatic effect the plane tangential to the surface makes a constant angle with a plane which is horizontal or vertical). See French certificate of addition FR No. 2 079 663, equivalent to U.S. Pat. No. 3,687,528.

(d) Improving suitability for binocular vision by inclining the main meridian curve from top to bottom of the lens surface away from the temporal region and towards the nasal region, and making the surface in such a manner that any two points on the surface which are equidistant from the main meridian curve in the horizontal direction have the same optical characteristics (see the above-mentioned French patents).

(e) Improving visual comfort for dynamic vision (see French certificate of addition FR No. 2 193 989, equivalent to U.S. Pat. No. 3,910,691.

However, up till now, it does not appear that the problem of reducing the effect of physiological adaption and the adaptation time when changing from one pair of lenses having a first value of power addition to another pair of lenses having a second, higher value of addition has been solved in a satisfactory manner, nor even that any attemmpt has been made to solve this problem.

Starting from a surface structure providing optical modulation and providing satisfactory overall visual comfort, the object of the present invention is to provide a multifocal opthalmic lens belonging to a family which is different from the above-mentioned first and second families of lenses, providing improved visual comfort for a person suffering presbyopia, regardless of the value of power addition of the lens, with the family of lenses of the present invention requiring a smaller effort of physiological adaptation and a shorter adaptation time when a person whose presbyopia is increasing changes lenses, going from one pair of lenses in accordance with the invention having a first value of power addition to another pair of lenses in accordance with the invention having a second, higher value of power addition.

After a long period of investigation and numerous tests performed on a sample on about 200 people, the Applicant has discovered that this object can be obtained.

SUMMARY OF THE INVENTION

The present invention provides a multifocal opthalmic lens comprising an aspherical surface having:
a first vision zone for far vision;
a second vision zone for near vison; and
a third vision zone between said first and second zones for intermediate vision, with the curvature in said third vision zone varying progressively along a main meridian curve of power progression, with the first and third vision zones being delimited by a first curve intersecting the main meridian curve at a first point, and with the second and third vision zones being delimited by a second curve intersecting the main meridian curve at a second point;
wherein the curvature of the main meridian curve begins to vary in the third vision zone at a third point which is offset from the first point by a first predetermined distance $d1 = f(A)$; and
wherein the curvature continues to vary in the second vision zone along an extension of the main meridian curve in the same direction of variation as along said main meridian curve and down to a fourth point which is offset from the second point by a second predetermined distance $d2 = h(A)$;
the curvature difference between the second and fourth points having a predetermined value $\Delta C = g(A)$; and
$f(A)$, $h(A)$, and $g(A)$ being decreasing functions of the power addition A of the lens between said first and second points.

Preferably, the functions $f(A)$ and $h(A)$ are chosen in such a manner that the distance between said third and fourth points is also a decreasing function of the power addition A between said first and second points.

BRIEF DESCRIPTION OF THE DRAWINGS

An embodiment of the invention is described by way of example with reference to the accompanying drawings, in which:

FIG. 1 is a front view showing the aspherical surface of a lens in accordance with the present invention;

FIGS. 2 to 4 show how some of the parameters used for defining the lens of FIG. 1 vary as a function of lens power addition in a family of lenses, each having different power addition;

FIG. 5 shows isoastigmatism curves of a lens in accordance with the invention having a power addition of 2 diopters;

FIG. 6 shows isopower curves of the FIG. 5 lens; and

FIG. 7 shows the image of a uniform grid of squares as seen through the lens of FIGS. 5 and 6.

MORE DETAILED DESCRIPTION

The lens L shown in FIG. 1 includes an aspherical surface S which may be concave or convex and which is preferably continuous. In conventional manner, the top portion of the surface S comprises a first spherical or aspherical vision zone VL whose curvature is suitable for far vision, and the bottom portion of the surface S comprises a spherical or aspherical second vision zone VP whose curvature is suitable for near vision. Preferably, the optical power of the zone VL is substantially constant, i.e. at any point in said zone, the power differs from the nominal power of said zone by no more than a predetermined value as defined by the following standards: DIN 58 203 part 4, and AFNOR NF S 11-004. In conventional manner, there is a third vision zone VI between the zones VL and VP and having a curvature which is suitable for intermediate vision and which varies along a main meridian curve MP passing substantially through the middle of the zone VI. Preferably, the curve MP is an umbilical line. However, it should be understood that it is acceptable for each point of said curve to have surface astigmatism which does not exceed 0.25 diopters. When the surface S is convex, the curvature of the main meridian curve MP increases (its radius of curvature decreases) from the top towards the bottom along said main meridian curve. However, when the surface S is a concave surface, the curvature decreases (the radius of curvature increases) from the top towards the bottom along said main meridian curve MP. As shown in FIG. 1, the main meridian MP is disposed at a small angle relative to the vertical, sloping from the temporal region towards the nasal region of the wearer of the spectacles (the lens shown in FIG. 1 is intended for use by the right eye of a wearer of spectacles). As also shown in FIG. 1, the vision zones VL and VI are delimited by a first curve C1 which intersects the main meridian curve MP at a first point A1, and along which the two zones VL and VI meet one another in a manner which is preferably continuous. Similarly, the two vision zones VI and VP are delimited by a second curve C2 which intersects the main meridian curve MP at a second point A2, and along which the two zones VI and VP meet one another in a manner which is preferably continuous.

In order to define the surface S of the lens of the present invention, it is normal practice to begin by selecting the variation law or progression law for the curvature of the main meridian curve MP. As usual, the variation law may be expressed by monotonic function which may be linear or otherwise. However, when determining the variation law, the curvature of the main meridian curve MP is caused to begin varying (to increase if S is a convex surface or to decrease if S is a concave surface) no longer at the poit A1 as has previously been the case, but at a point A3 which is situtated in the vision zone VI and which is spaced apart from the point A1 by a first predetermined distance d1. In addition, the variation law is chosen in such a manner that the curvature continues to vary along an extension MP' of the main meridian curve MP in the same direction of variation as a long said curve MP, down to a fourth point A4 which is situated in the vision zone VP and which is spaced apart from the point A2 by a second predetermined distance d2, with the difference in curvature between the points A2 and A4 having a predetermined value $\Delta C$. More precisely, the distances d1 and d2 and the curvature difference $\Delta C$ are decreasing functions of the power addition A between the points A1 and A2. In other words, in the surface S of the lens of the invention, the curvature of the main meridian curve MP begins to increase (or to decrease) at a point A3 which is offset from the point A1 towards the bottom of the surface S by an amount which increases with decreasing power addition A of the lens L. Similarly, the curvature of the main meridian curve MP continues to increase (or to decrease) down to a point A4 which is offset away from the point A2 towards the bottom of the surface S by an amount which increases with decreasing power addition A of the lens. In addition, the smaller the power addition A, the greater the curvature difference ΔC between the points A2 and A4. Thus, in a lens of the present invention, the vision zone VP normally reserved for near vision receives extra power compared with the nominal power addition A between the points A1 and A2.

Preferably, the distance D between the points A3 and A4 is also a decreasing function of the power addition A between the points A1 and A2. The functions defining the distances d1 and d2 and the curvature difference ΔC may have the following form, for example:

$$d1 = f(A) = a[A_{max} - A)/b]^3 \quad (1)$$

$$d2 = h(A) = d + (A_{max} - A)^2 \quad (2)$$

$$\Delta C = g(A) = K[1 - e^{-c}(1 - A/A_{max})^3] \quad (3)$$

in which: the distances d1 and d2 are expressed in millimeters and are measured along the main meridian curve MP or along its extension MP'; A is the value (expressed in diopters) of the power addition between the points A1 and A2 for a given lens of the invention; Amax is the maximum value expressed in diopters of said power addition between the points A1 and A2 for a family of lenses of the invention; ΔC is expressed in $m^{-1}$; a, b, c, and d are constants; and K is a coefficient which depends on the value of the refractive index n of the material from which the lens is made, such that:

$$K = (\Delta P_{max})/(n-1) \quad (4)$$

where ΔPmax is the maximum value expressed in diopters of the additional increase in power desired between the points A2 and A4. Preferably, the constants a, b, c, and d, and ΔPmax are chosen to have the following values: a=4; b=3; c=8; d=1 mm; ΔPmax=0.5 diopters; thus giving K=1 for a glass having a refractive index of 1.5. FIGS. 2, 3, and 4 respectively show how d1, ΔC, and d2 vary as a function of the power addition A for the above-mentioned values of the constants a, b, c, and d, and ΔPmax, and for Amax=3.5 diopters. Table 1 below summarizes the vales of the parameters charcterizing a family of lenses of the invention, having power additions at 0.5 diopter intervals between 0.5 diopters and 3.5 diopters. In Table 1, ΔP designates the extra power addition provided by the curvature variation ΔC between the points A2 and A4 [ΔP=(n−1)ΔC], and A' designates the total power addition between the points A3 and A4 (A'=A +ΔP). In addition, in Table 1, D designates the distance, in millimeters, between the points A3 and A4, i.e. the length of the portion of the main meridian curve MP and of its extension MP' along which the optical power of the lens increases. This distance D can easily be calcuated from equations (1) and (2) and taking account of the fact that:

$$D = D0 - d1 + d2 \quad (5)$$

where D0 is the distance between the points A1 and A2, said distance D0 having the same value for all the lenses of a family of lenses of the present invention. For example, D0 may be equal to 20 mm. In the table of FIG. 1, D has been calculated using this value of D0.

TABLE 1

| A (diopters) | 0.5 | 1 | 1.5 | 2 | 2.5 | 3 | 3.5 |
|---|---|---|---|---|---|---|---|
| d1 (mm) | 4 | 2.3 | 1.2 | 0.5 | 0.15 | 0.02 | 0 |
| d2 (mm) | 10 | 7.2 | 5 | 3.3 | 2 | 1.2 | 1 |
| D (mm) | 26 | 24.9 | 23.8 | 22.8 | 21.9 | 21.2 | 21 |
| ΔC ($m^{-1}$) | 0.994 | 0.946 | 0.775 | 0.466 | 0.171 | 0.023 | 0 |
| ΔP (diopters) | 0.497 | 0.473 | 0.388 | 0.233 | 0.086 | 0.012 | 0 |
| A' (diopters) | ≈1 | 1.47 | 1.89 | 2.23 | 2.59 | 3.01 | 3.5 |

From Table 1, it can be seen that the distance D between the points A3 and A4 decreases as the addition A increases. By way of comparison, it is recalled that in the first prior family of lenses (French Pats. Nos. 2 058 499, 2 079 663, and 2 183 989, and their equivalents as specified above), the optical power varies only between the points A1 and A2, and the distance D0 between these two points is constant. Similarly, it is recalled that in the second prior family of lenses (Japanese Pat. No. 54-85743), in which the power gradient is constant and has the same value for all the lenses of said second family, the distance D0 between the points A1 and A2 between which the optical power of the lens varies, increases with increasing power addition A.

Once the progression law has been chosen, and the distances d1 and d2, and the curvature difference ΔC between the points A2 and A4 have been determined as mentioned above, the remainder of the surface S of the lens L may be determined in conventional manner, for example as described in the Applicants' above-mentioned French patents.

Account should be taken, in particular, of binocular vision, and the surfaces of lenses in accordance with the invention should be designed in such a manner that, with reference to FIG. 1, two corresponding points of the surface, i.e. two points which are equidistant in the horizontal direction from the main meridian curve MP have the same optical characteristics, and in particular a vertical prismatic effect of the same value.

FIG. 5 shows the isoastigmatism curves of a lens of the present invention for the right eye, the lens having an outside diameter of 60 mm and a power addition A of 2 diopters (in reality, it has a total power addition A' of about 2.2 diopters, see Table 1) for the case where a, b, c, d, Amax, ΔPmax, n, and D0 have the above-indicated values. FIG. 6 shows the isopower curves of the FIG. 5 lens, and FIG. 7 shows the image of a grid having uniform squares as seen through said lens.

In FIGS. 5, 6, and 7, the main meridian curve MP is shown vertically in order to simplify the figures. In practice, the lens in accordance with the invention whose optical properties and characteristics are shown in FIGS. 5 to 7 is a lens intended for use with a person's right eye.

Tests performed by the Applicant using lenses of the invention on a relatively large number of people have shown not only that the people being tested had a sensation of greeater visual comfort than with previously known multifocal lenses, but also that as their presbyopia increased and they needed to change lenses for lenses having higher power addition, they suffered much less discomfort and adapted physiologically more quickly to their new, higher power lenses than with conventional multifocal lenses. Although it is difficult to explain this improvement given that it is practically impossible to express it in figures, an attempt at an explanation may be made as follows. With multifocal lenses of the present invention, regardless of the power addition value A, the length D of the portion of the main meridian curve MP along which curvature, i.e. optical power, varies is greater than in conventional multifocal lenses. As a result, the deformations of the surface S due to the variations in curvature along the main meridian curve MP, and thus the optical aberrations, are more spread out in the vertical direction and therefore vary more gently than in conventional multifocal lenses. For equal power addition values A, the power gradient between the points A3 and A4 of a lens of the present invention is less than the power gradient between the points A1 and A2 of a prior art multifocal lens. Further, compared with the first prior family of multifocal lenses, in which the distance D0 between the points A1 and A2 is constant, and in which the power gradient between these two points consequently increases when the power addition value A increases, with the family of multifocal lenses of the invention the value of the power gradient between the points A3 and A4 changes much less than it does in prior multifocal lenses of said first family when the user changes from a lens having a first value of power addition to another lens having a second value of power addition which is higher than the first. This result is completely unexpected when it can be seen from Table 1 above that the value of the distance D decreases as the value of the power addition A increases, whereas the value of the distance D0 remains constant in prior multifocal lenses of said first family. By way of comparison, Table 2 below shows the values of the mean power gradient G between the points A3 and A4 in a family of multifocal lenses of the invention (G=A'/D), together with the values of the mean power gradient G' between the points A1 and A2 of said first prior family of multifocal lenses (G'=A/D0) for different power addition values A lying in the range 0.5 diopters to 3.5 diopters, and assuming that the distance between the points A1 and A2 between which optical power varies in lenses of said first prior family has the same value of D0 as in lenses of the invention, i.e. 20mm in the example under consideration. In Table 2, the values of G have been calculated on the basis of the values of A' and D given in Table 1.

TABLE 2

| A (diopters) | 0.5 | 1 | 1.5 | 2 | 2.5 | 3 | 3.5 |
|---|---|---|---|---|---|---|---|
| A' (diopters) | ≈1 | 1.47 | 1.89 | 2.23 | 2.59 | 3.01 | 3.5 |
| G (diopters/mm) | 0.038 | 0.059 | 0.079 | 0.098 | 0.118 | 0.142 | 0.166 |
| G' (diopters/mm) | 0.025 | 0.050 | 0.075 | 0.100 | 0.125 | 0.150 | 0.175 |

Naturally, the embodiment of the present invention described above has been given purely by way of non-limiting example, and numerous modifications may be made by the person skilled in the art without thereby going beyond the scope of the present invention. Thus, in particular, the constants a, b, c, and d may have values other than those indicated above, in order to ensure that ΔC and ΔP have higher values than those given in Table 1 at high values of power addition, e.g. ΔC=0.3 m$^{-1}$ for A=2.5 diopters, ΔC=0.2 m$^{-1}$ for A=3 diopters, and ΔC=0.12 m$^{-1}$ for A=3.5 diopters.

I claim:

1. A multifocal ophthalmic lens comprising an aspherical surface having:
   a first vision zone for far vision;
   a second vision zone for near vision; and
   a third vision zone between said first and second zones for intermediate vision, with the curvature in said third vision zone varying progressively along a main meridian curve of power progression, with the first and third vision zones being delimited by a first curve intersecting the meridian curve at a first point, and with the second and third vision zones being delimited by a second curve intersecting the main meridian curve at a second point;
   wherein the curvature of the main meridian curve begins to vary in the third vision zone at a third point which is offset from the first point by a first predetermined distance d1=f(A); and
   wherein the curvature continues to vary in the secod vision zone along an extension of the main meridian curve from said second point to a fourth point which is offset from the second point by a second predetermined distance d2=h(A),
   the curvature varying from said second point to said fourth point in the same direction of variation as from the third point to the second point;
   the curvature difference between the second and fourth points having a predetermined value ΔC=g(A); and
   f(A), h(A), and g(A) being decreasing functions of the power addition A of the lens between said first and second points.

2. A multifocal ophthalmic lens according to claim 1, wherein the functions f(A) and h(A) are chosen in such a manner that the distance D between said third and fourth points is also a decreasing function of the power addition A between said first and second points.

3. A multifocal opthalmic lens according to claim 2, wherein the functions f(A), g(A), and h(A) are given by the following equations:

$$d1 = f(A) = a\,[(A_{max}-A)/b]^3 \quad (1)$$

$$d2 = h(A) = d + (A_{max}-A)^2 \quad (2)$$

$$\Delta C = g(A) = K \quad (3)$$

in which a, b, c, and d are constants, K is a coefficient depending on the value of the refractive index n of the material from which the lens is made such that:

$$K = \Delta P_{max}/(n-1)$$

where ΔPmax is a predetermined maximum of the additional increase in power between the second and fourth points, and Amax is the maximum power addition between the first and second points for a given family of lenses.

4. A multifocal opthalmic lens according to claim 3, wherein a=4, b=3, d=1 mm, c=8, ΔPmax=0.5 diopters, and Amax=3.5 diopters, with the distance d1 and d2 as calculated by the equations (1) and (2) respectively being measured along the main meridian curve or its extension and being expressed in millimeters, and with the curvature difference ΔC being expressed in m$^{-1}$.

* * * * *